United States Patent
Farnsworth

(10) Patent No.: US 7,194,277 B2
(45) Date of Patent: Mar. 20, 2007

(54) APPARATUS AND METHOD FOR HANDLING MESSAGES THAT RELATE TO A CELL OTHER THAN THE CURRENTLY OPERATING CELL IN UNIVERSAL MOBILE TELECOMMUNICATIONS SYSTEM USER EQUIPMENT

(75) Inventor: Andrew John Farnsworth, Bromsgrove (GB)

(73) Assignee: M-Stack Limited, Birmingham (GB)

( * ) Notice: Subject to any disclaimer, the term of this patent is extended or adjusted under 35 U.S.C. 154(b) by 185 days.

(21) Appl. No.: 10/704,839

(22) Filed: Nov. 10, 2003

(65) Prior Publication Data

US 2005/0101299 A1 May 12, 2005

(51) Int. Cl.
*H04Q 7/20* (2006.01)

(52) U.S. Cl. ............... 455/458; 455/422.1; 455/432.1; 455/432.2; 455/435.1; 455/435.2; 455/456.1; 455/466

(58) Field of Classification Search ............. 455/421, 455/422.1, 524, 525, 435.1, 435.2, 435.3, 455/432.1, 432.2, 432.3, 433, 434, 456.1, 455/456.2, 456.3, 456.4, 456.5, 456.6, 458, 455/459, 412.1, 466; 340/7.2, 7.27, 7.29, 340/7.41, 7.25

See application file for complete search history.

(56) References Cited

U.S. PATENT DOCUMENTS

| | | | | |
|---|---|---|---|---|
| 5,548,816 A | * | 8/1996 | DeVaney | ............... 455/456.2 |
| 6,023,461 A | | 2/2000 | Raychaudhuri et al. | |
| 6,275,706 B1 | * | 8/2001 | Rune | ................... 455/456.1 |
| 6,334,052 B1 | * | 12/2001 | Nordstrand | ............. 455/411 |
| 6,516,193 B1 | * | 2/2003 | Salmela et al. | ........... 455/432.3 |
| 6,549,787 B1 | * | 4/2003 | Ravi | ..................... 455/525 |
| 6,628,942 B1 | * | 9/2003 | Beming et al. | ........... 455/432.1 |
| 6,829,482 B2 | * | 12/2004 | Rune et al. | ................ 455/442 |
| 6,898,429 B1 | * | 5/2005 | Vialen et al. | ............ 455/432.1 |
| 2004/0116146 A1 | * | 6/2004 | Sadowsky et al. | .......... 455/525 |
| 2005/0009527 A1 | * | 1/2005 | Sharma | ..................... 455/445 |

FOREIGN PATENT DOCUMENTS

WO WO03/085902 A1 10/2003

OTHER PUBLICATIONS

3GPP TSG RAN WG2 #38: "Cell Update During Reconfiguration", TDOC R2-032095; Oct. 6, 2003.

Universal Mobile Telecommunications System (UMTS); Radio Resource Control (RRC) Protocol Specification (DGPP TS 25.331 Version 3.15.0 Release 1999), no month listed.

* cited by examiner

*Primary Examiner*—Joseph Feild
*Assistant Examiner*—Olumide Ajibade-Akonai

(57) ABSTRACT

Apparatus and a method for handling messages that relate to a cell other than the currently operating cell in universal mobile telecommunications system user equipment are disclosed.

7 Claims, 9 Drawing Sheets

APPARATUS AND METHOD FOR HANDLING MESSAGES THAT RELATE TO A CELL OTHER THAN THE CURRENTLY OPERATING CELL IN UNIVERSAL MOBILE TELECOMMUNICATIONS SYSTEM USER EQUIPMENT

BACKGROUND

1. Technical Field

This application relates to UMTS (Universal Mobile Telecommunications System) in general, and to an apparatus and method for handling messages that relate to a cell other than the currently operating cell in universal mobile telecommunications system user equipment in particular.

2. Description of the Related Art

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

In accordance with (clause 8.2.2.3 of) the 25.331 specification, the UTRAN may send a message to the UE which includes an information element (IE) known as C-RNTI (Cell-Radio Network Temporary Identifier). The value of C-RNTI is unique within a given cell; but values may be re-used in neighbouring cells. The message can be acted on immediately or at some time in the future, generally up to a maximum of 2.55 seconds in the future, although usually this is expected to be considerably less than that. The UE may reply with a response message, which would normally be sent from the UE at or shortly after the UE has acted on the received message.

When switching from a dedicated to a common channel in UMTS, the UE is assigned a temporary identifier known as C-RNTI (Cell Radio Network Temporary Identifier). This temporary identifier C-RNTI is specific to a cell and is valid in the cell where the UE uses resources. The C-RNTI is used to distinguish between different user equipment in that cell.

An example of such a procedure is illustrated in FIG. 1, in which a Reconfiguration command is sent at S10 from the UTRAN to the UE, with a new configuration X. The requested new configuration X, typically a dedicated physical channel, is applied at both the UE and the UTRAN at an activation time. The new configuration is received by the UE at S11 is generally applied at the UE before sending a Reconfiguration_COMPLETE response at S12. If the reconfiguration fails for any reason, the UE will revert to its previous configuration and may send a Reconfiguration_FAILURE message indicating that the reconfiguration has failed.

However, if an event occurs that requires a cell update to be invoked while the reconfiguration procedure is ongoing, the current 3GPP standards do not unambiguously define the required behaviour of the UE, so potentially leading to interoperability problems. Some examples of events requiring a cell update to be invoked are defined in clause 8.3.1.2 of the 25.331 specification and include the conditions of radio link failure, re-entering service area, RLC unrecoverable error, cell re-selection and periodical cell update.

A typical cell update procedure is illustrated in FIG. 2. On the occurrence of a trigger event at S20, the UE selects a new cell (cell 2) and moves to communicate with cell 2 at a time indicated by the dotted line. The UE then sends a CELL UPDATE request message to the UTRAN at S22, which tracks the state of the UE. The UTRAN returns a CELL UPDATE CONFIRM (Y) message, where Y represents the reconfiguration carried by the CELL UPDATE CONFIRM message. Both the UTRAN and UE apply the new configuration Y and the UE sends a response to the UTRAN, confirming the completion of the reconfiguration procedure. When the procedure completes, the UTRAN knows both the state of the UE and its current configuration (FACH+Y), as required to maintain communication.

In addition to the general interaction of the cell update and reconfiguration procedures, another scenario needs to be taken into account when designing UTRAN behaviour. This is the crossover of the CELL UPDATE command with the Reconfiguration command.

FIG. 3 illustrates the situation where a Reconfiguration command is issued by the UTRAN at S30 but reaches the UE at S33 after the UE has undergone a trigger event at S31 which causes the UE to move to cell 2 and to send the CELL UPDATE command to the UTRAN at S32. In this case, since CU has started, the Reconfiguration command is rejected per clause 8.6.3.11 of the 25.331 specification. The UE and UTRAN then apply the cell update configuration Y at S34 and S35. The UE then sends a confirmatory response message at S36 and a Reconfiguration_FAILURE message at S37 to the UTRAN. If the UTRAN applies X on receipt of the cell update response message, it must revert to the previous configuration when it receives the Reconfiguration_FAILURE message.

There are thus proposed strategies for dealing with messages that may contain a C-RNTI that relates to a cell other than the cell in which the UE is currently operating. A number of such strategies are detailed below.

Other aspects and features of the present invention will become apparent to those ordinarily skilled in the art upon review of the following description of specific embodiments of an apparatus and method for handling messages that relate to a cell other than the currently operating cell in a UMTS user equipment.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

The needs identified in the foregoing Background, and other needs and objects that will become apparent from the following description, are achieved by, in one aspect, a method for processing a message in a mobile telecommunications device. In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link.

C-RNTI, the Cell Radio Network Temporary Identity, is a UE identifier allocated by a controlling Radio Network Controller (RNC) and it is unique within one cell controlled by the allocating RNC. C-RNTI can be reallocated when a UE accesses a new cell with a cell update procedure. C-RNTI is used as a UE identifier in DCCH/DTCH common channel messages on the radio interface.

Figure 1:
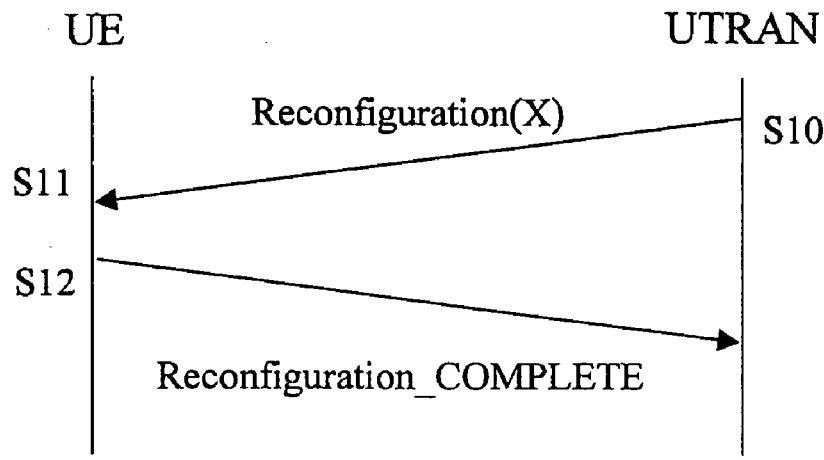
FIG. 1 illustrates a reconfiguration procedure in a UMTS system.
Figure 2:
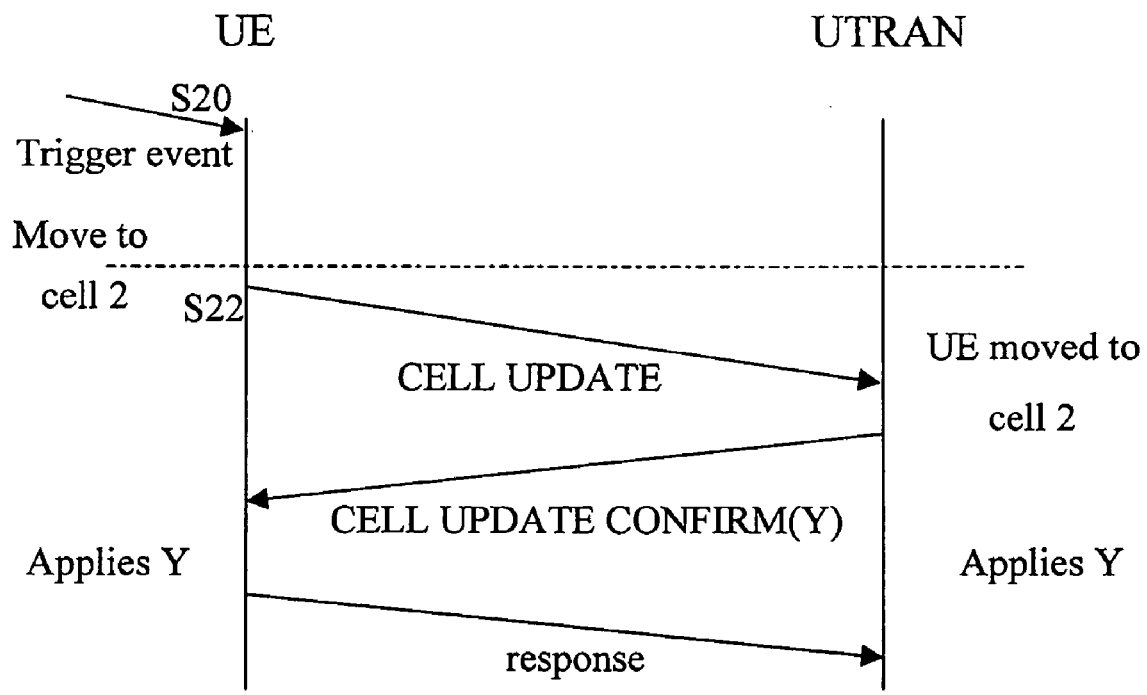
FIG. 2 illustrates a cell update procedure in a UMTS system.
Figure 3:
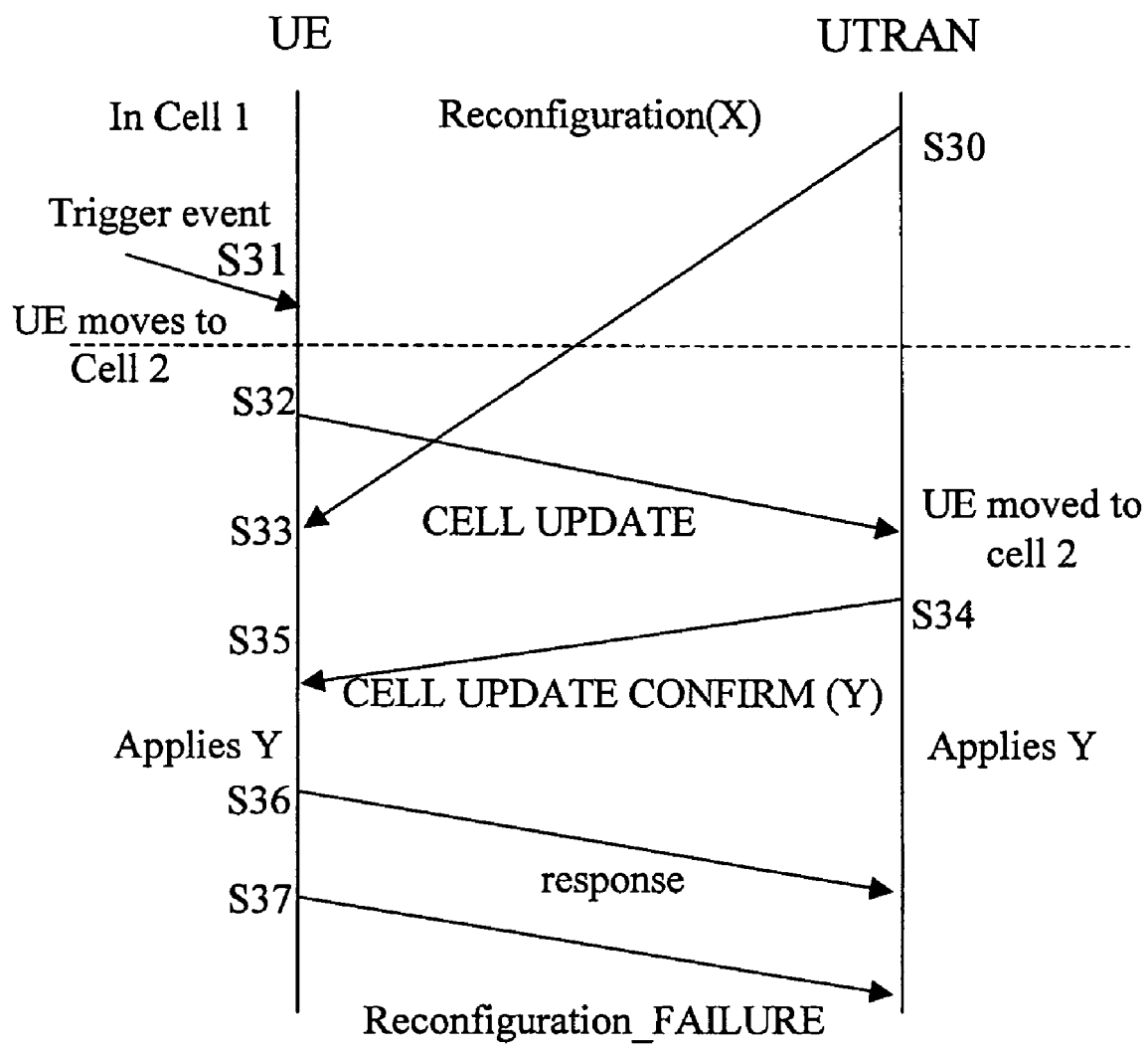
FIG. 3 illustrates a crossover of the Cell Update command with a reconfiguration command from the UTRAN.
Figure 4:
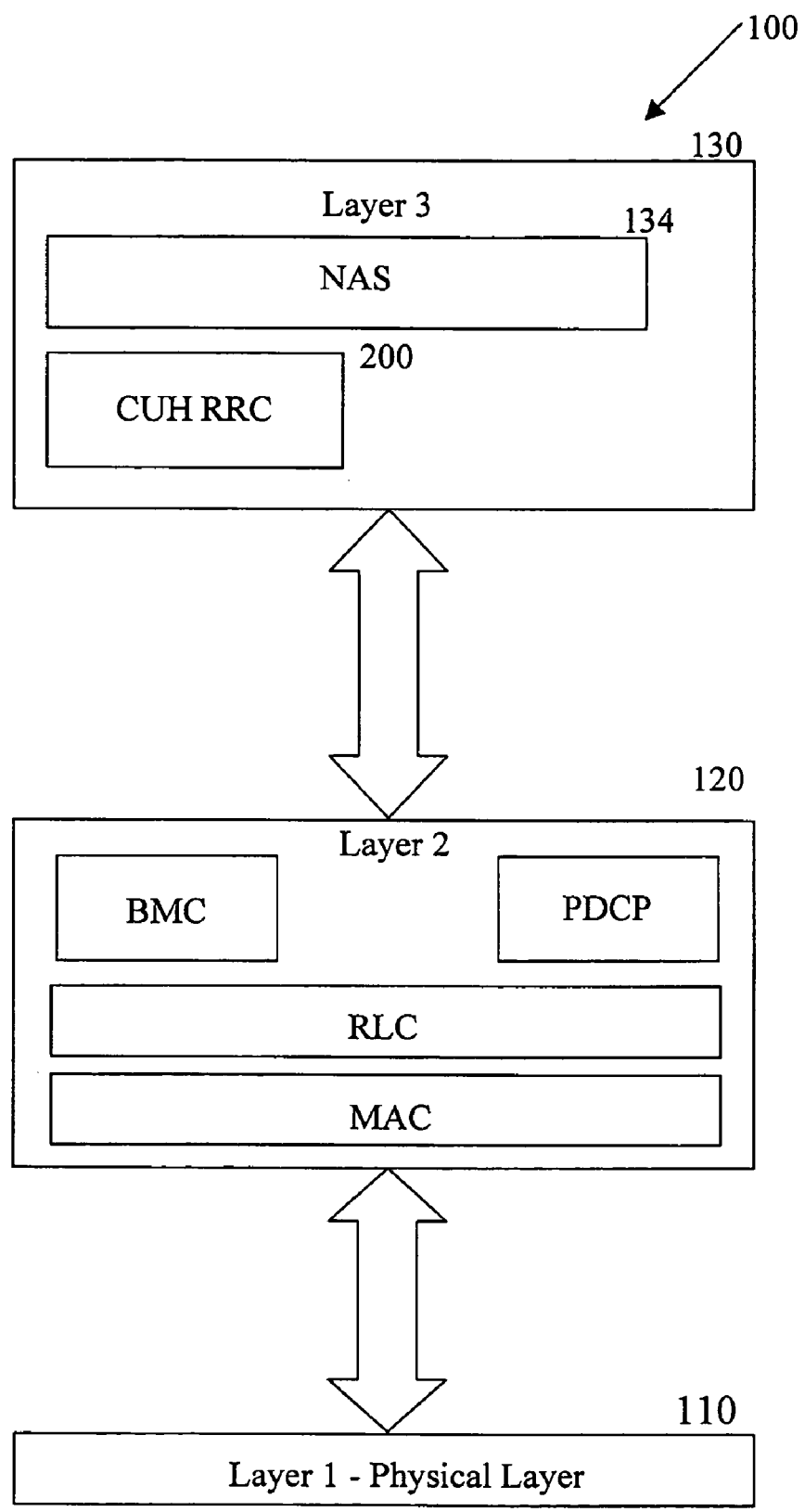
FIG. 4 is a block diagram illustrating an embodiment of a protocol stack apparatus provided with a cell update handling RRC block, in accordance with the present application.

Referring to the drawings, FIG. 4 is a block diagram illustrating an embodiment of a protocol stack apparatus provided with a cell update handling RRC block, in accordance with the present application.

The CUH RRC block (Cell Update Handling RRC) 200 is a sub layer of Layer 3 130 of a UMTS protocol stack 100. The CUH RRC 200 exists in the control plane only and provides an information transfer service to the non-access stratum NAS 134. The CUH RRC 200 is responsible for controlling the configuration of radio interface Layer 1 110 and Layer 2 120. When the UTRAN wishes to change the UE configuration it will issue a message to the UE containing a command to invoke a specific RRC procedure. The CUH RRC 200 layer of the UE decodes this message and initiates the appropriate RRC procedure. Generally when the procedure has been completed (either successfully or not) then the CUH RRC sends a response message to the UTRAN (via the lower layers) informing the UTRAN of the outcome. It should be noted that there are a few scenarios where the CUH RRC will not issue a response message to the UTRAN and, in those cases the CUH RRC need not and does not reply.

The CUH RRC block 200 can implement several different behaviour strategies for coping with the interaction of a Cell Update procedure with a reconfiguration that has already started. These are summarised below, and then explained in detail subsequently, with reference to the drawings.

Figure 5:
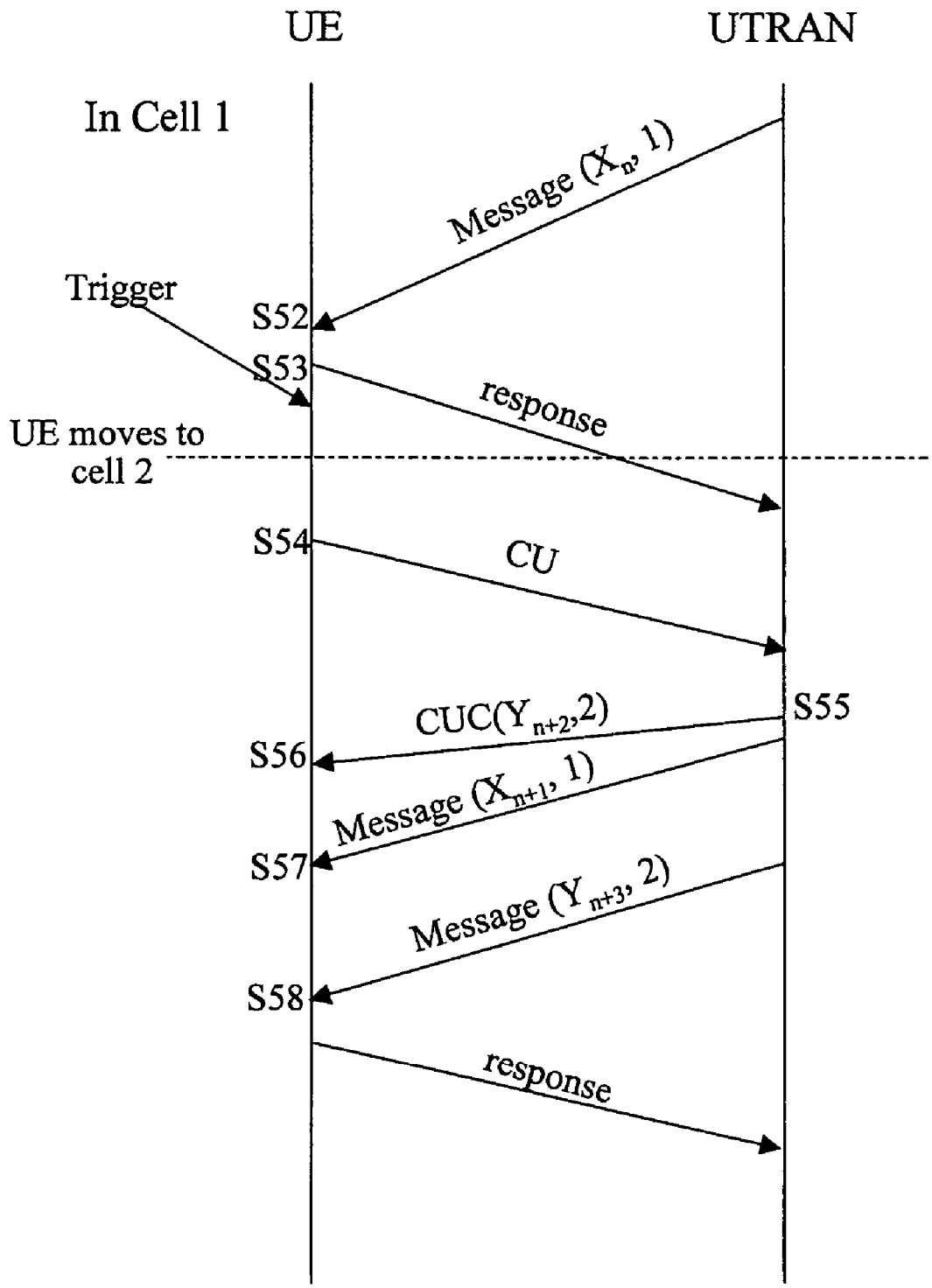
FIG. 5 illustrates the operation of a first embodiment.

In the first embodiment, action is taken to ensure that the UE can tell in which cell a message was originally queued to be sent. FIG. 5 is a diagram illustrating the implementation of the first embodiment. Message ($X_n$, 1) is sent from the UTRAN to the UE, where n indicates the sequence number of the message and 1 indicates that the message is sent from cell 1. The UE, which is currently in Cell 1, receives this message at S52 and acts upon the message. The message may require a response in which case the UE at S53 sends a response to the UTRAN. The UE then receives a trigger which causes the UE to move to another cell e.g. Cell 2. Examples of such a trigger are in response to periodic measurements of the signal condition undertaken by the UE, for instance signal strength or signal quality. When undertaking these periodic measurements, the UE may determine that the signal from Cell 2 is of a higher quality then the signal from Cell 1 and therefore the UE initiates a cell update procedure to move to cell 2. In response to the UE determining that it should move to communicate with Cell 2 rather than Cell 1, the UE at S54 sends a cell update (CU) command to the UTRAN. In response at S55 the UTRAN sends a cell update command CUC ($Y_{n+2}$, 2) which is received via the UE at S56. In response the UE updates itself in accordance with the CUC message. If, subsequent to the cell update process, the UE receives, say at S67, a UM (Unacknowledge Mode) message from the UTRAN which includes a field that indicates that the message was not sent from Cell 2 e.g., message ($X_{n+1}$, 1) the UE does not fully operate on this message as the cell identifier 1 does not correspond to the current cell i.e. Cell 2. For UM messages, it is most likely that the UE will ignore the message since no acknowledgement to the UTRAN is required. However, the UE may take other action, for instance it could reject the message, ignore C-RNTI in the message or go to idle. On receipt of a message e.g., message ($Y_{n+3}$, 2) at step S58, the UE examines the cell identifier in the message and recognises that the message includes a cell identifier 2 that relates to the current cell. This message is therefore acted upon.

Examples of the cell identifier that may be used in the messages to identify the cell from which the message was queued to be sent include CPICH (in FDD mode operation) and CPCCH (in TDD mode of operation).

It may not be necessary to include a cell identifier in all messages sent by the UTRAN. Typical examples of the messages for which a cell identifier is included are as follows: RRC Connection Setup, Reconfiguration Messages (i.e., Radio Bearer Setup, Radio Bearer Reconfiguration, Radio Bearer Release, Transport Channel Reconfiguration or Physical Channel Reconfiguration), Cell Update Confirm, URA Update Confirm and UTRAN mobility information.

Figure 6:
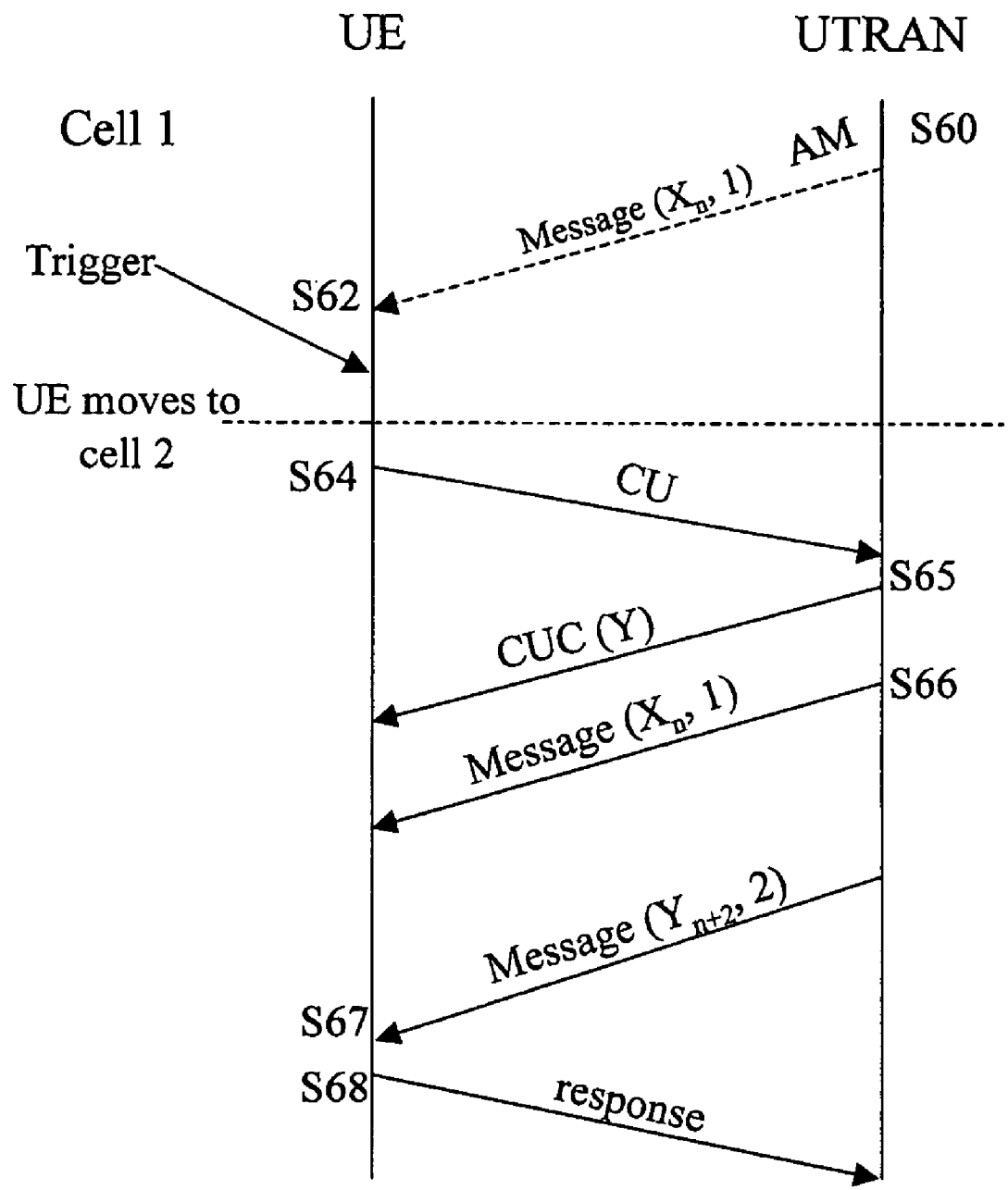
FIG. 6 illustrates the operation of a second embodiment.

FIG. 6 shows a second embodiment. In this embodiment the operation relating to messages in AM (Acknowledge Mode) will be considered. In this case a message ($X_n$, 1) is sent at S60 from the UTRAN but for some reason it is not received by the UE. Subsequent to this, at S62 the UE receives a trigger, which causes the UE to move to Cell 2. In response, the UE sends a CU message to the UTRAN at S64 and the UTRAN in response sends a CUC message at S65. As the UTRAN has not received an acknowledgement of receipt of the message ($X_n$, 1), the UTRAN retransmits this message to the UE at step S66. However, as this message from the UTRAN includes a cell identifier that identifies Cell 1 rather than Cell 2, the UE does not act fully on this message from the UTRAN. This continues for any messages which include an identifier for cell 1 e.g., message ($X_{n+1}$, 1). When AM messages are retransmitted, they are not altered. On receipt of a message ($Y_{n+2}$, 2) at S67 the UE recognises this as a message from the current cell and therefore acts upon this message and sends a response at S68 if necessary.

Thus, the UE is able to tell in which cell the message was originally to be sent. Providing a cell identifier in the message allows the UE to be able to associate any C-RNTI included in the message with the cell in which is was sent. Therefore the UE avoids applying the C-RNTI contained within a message identified as sent from a cell different from the cell in which the UE received the message. The UE can take appropriate action for a message which was received in a cell different to that specified in the cell identifier. For instance for a message in AM mode which includes a C-RNTI in the message the action could be: reject the message; ignore the new C-RNTI within the message and otherwise act on the message; ignore the message; or go to IDLE state etc.

In another embodiment, if the UE was in CELL_FACH state upon reception of a reconfiguration message and remains in CELL_FACH state, the UE operates as follows. If the IE "Frequency info" is not included in the received reconfiguration message and if the IE "Primary CPICH info" (for FDD) or "Primary CCPCH info" (for TDD) is included, the UE ignores the content of the IE "Primary CPICH info" (for FDD) or "Primary CCPCH info" (for TDD) and of the IE "New C-RNTI" if the IE "New C-RNTI" was included in the received reconfiguration message and proceed as set out further in the 25.331 standard. Reconfiguration messages comprise the following: Radio Bearer Setup message, Radio Bearer Reconfiguration message, Radio Bearer Release message, Transport Channel Reconfiguration message or Physical Channel Reconfiguration message.

Figure 7:
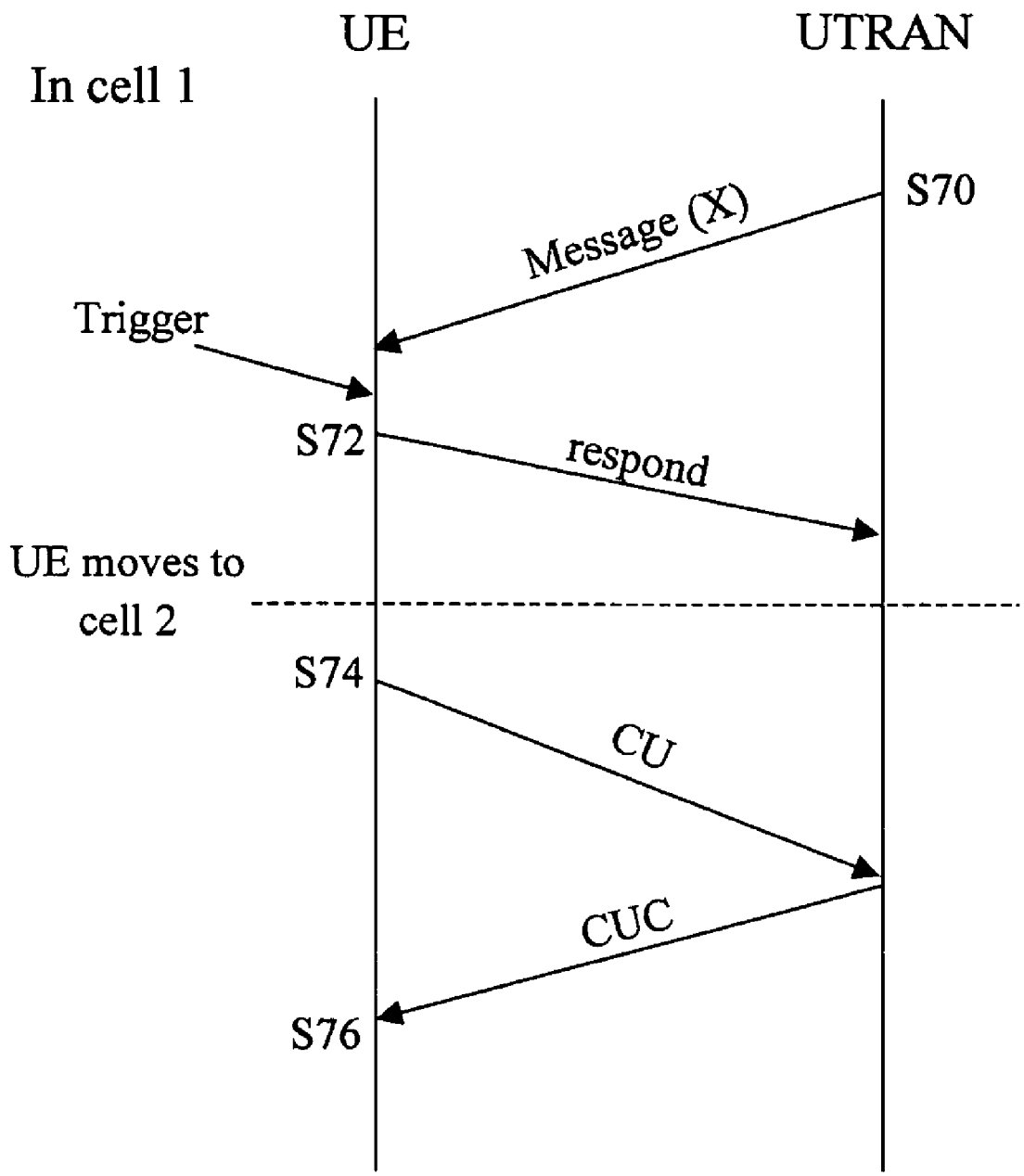
FIG. 7 illustrates the operation of a third embodiment.

FIG. 7 shows another embodiment in which a message is received by the UE but the procedure evoked by that receipt is interrupted and the UE moves to a different cell. In this embodiment the message received is processed in the context in which it was received. For instance the UE may process the message before moving to a different cell. Alternatively, the UE may remember the context in which the message was received, including the state (e.g., Cell_FACH or Cell_DCH) and the cell in which the message was received. For instance if the message received included a C-RNTI, the UE may ignore the message as the UE knows that the UE has moved from the cell from which the message including the C-RNTI was sent. This is illustrated in FIG. 7. At S70 a message (X) is sent from the UTRAN to the UE. The UE then receives a trigger to move to a different cell. However, as the UE knows that it has received a message that was applicable in the pre-trigger conditions, it first acts on this message and sends a response at S72 (if appropriate).

The UE then responds to the trigger by moving to cell 2 as shown in FIG. 7. The UE then acts in a conventional manner by sending a cell update message to the UTRAN at S74 and receiving a CUC message from the UTRAN at S76.

Figure 8:
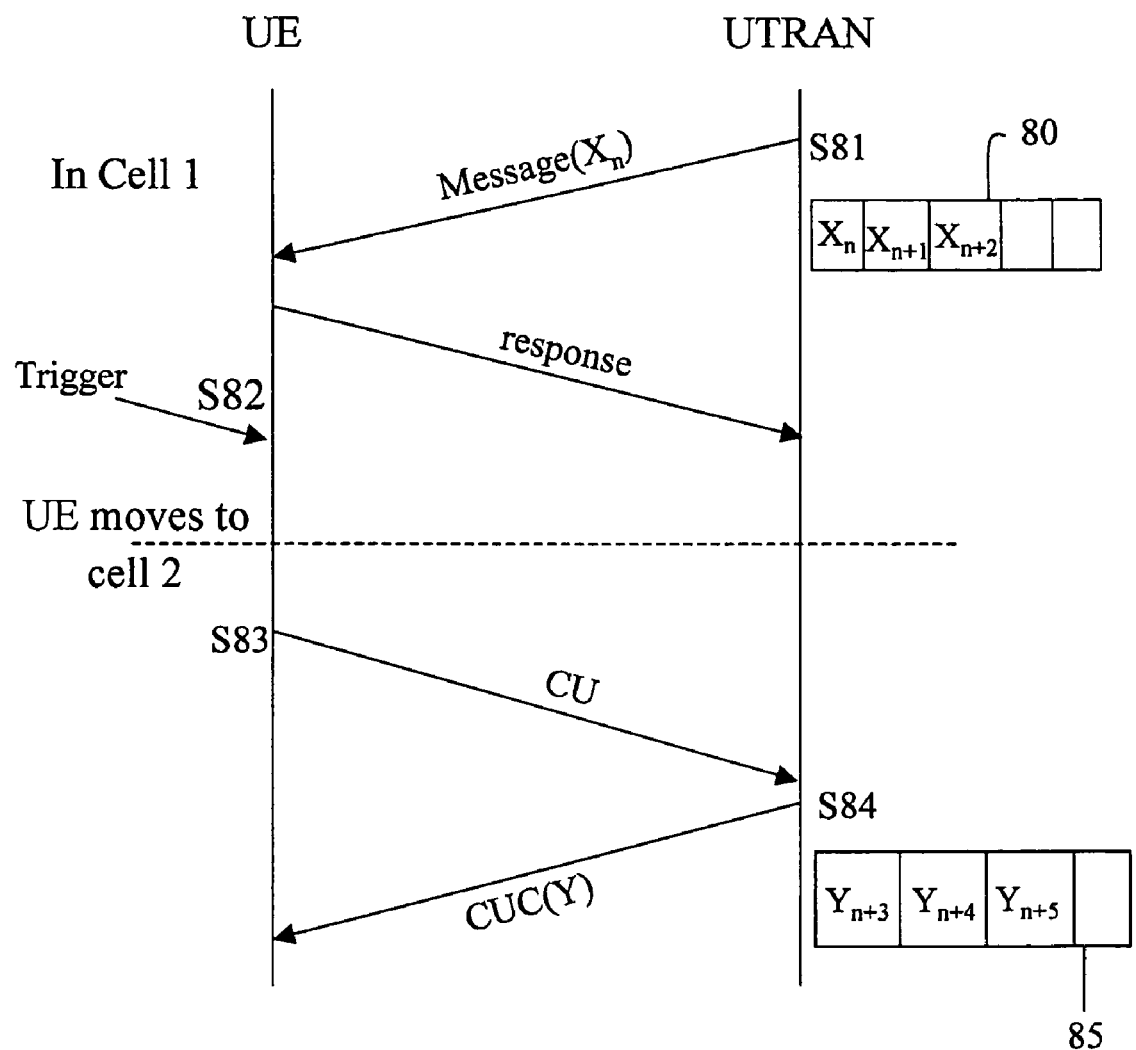
FIG. 8 illustrates the operation of a fourth embodiment.

FIG. 8 shows a further embodiment which aims to ensure that once a message has been queued for transmission in a particular cell in an Unacknowledge Mode, the message is not redirected to a different cell when the UTRAN discovers that the UE is in the different cell. The message is either sent in the original cell or not sent at all. This is illustrated in FIG. 8.

The UTRAN generates a queue 80 of messages to be sent to a particular UE. Each message has associated with it a sequence number n which is sequentially incremented. Thus the queue 80 as shown in FIG. 8 includes 3 messages $X_n$, $X_{n+1}$, $X_{n+2}$ intended for the UE in cell 1. These messages are sent to the UE in the normal manner. Thus FIG. 8 shows the UTRAN sending message $X_n$ to the UE. At S82, the UE receives a trigger, which causes the UE to move to Cell 2. In response, the UE sends a CU message at S83. The UTRAN receives the CU message and, in response, generates a CUC message with state Y at S84. In response to receiving the CU message, the UTRAN empties from the queue for the UE all messages generated when the UE was in Cell 1. The UTRAN then generates a queue 85 of messages for the UE all of which were generated whilst the UE was in Cell 2. This avoids the UTRAN sending any messages to the UE that were generated when the UE was in the previous cell.

Alternatively, the queue 80 of messages generated when the UE was in the previous cell may be sent from the previous cell, Cell 1, rather than the current cell, Cell 2. This would mean that messages that were originally intended for the UE are sent by the UTRAN using the characteristics used by the UE in Cell 1 which are different to the characteristics used by the UE in Cell 2. The messages are therefore redundant within the network. However, this alternative embodiment means that the UTRAN does not have to reorder message queues for particular UEs.

Figure 9:
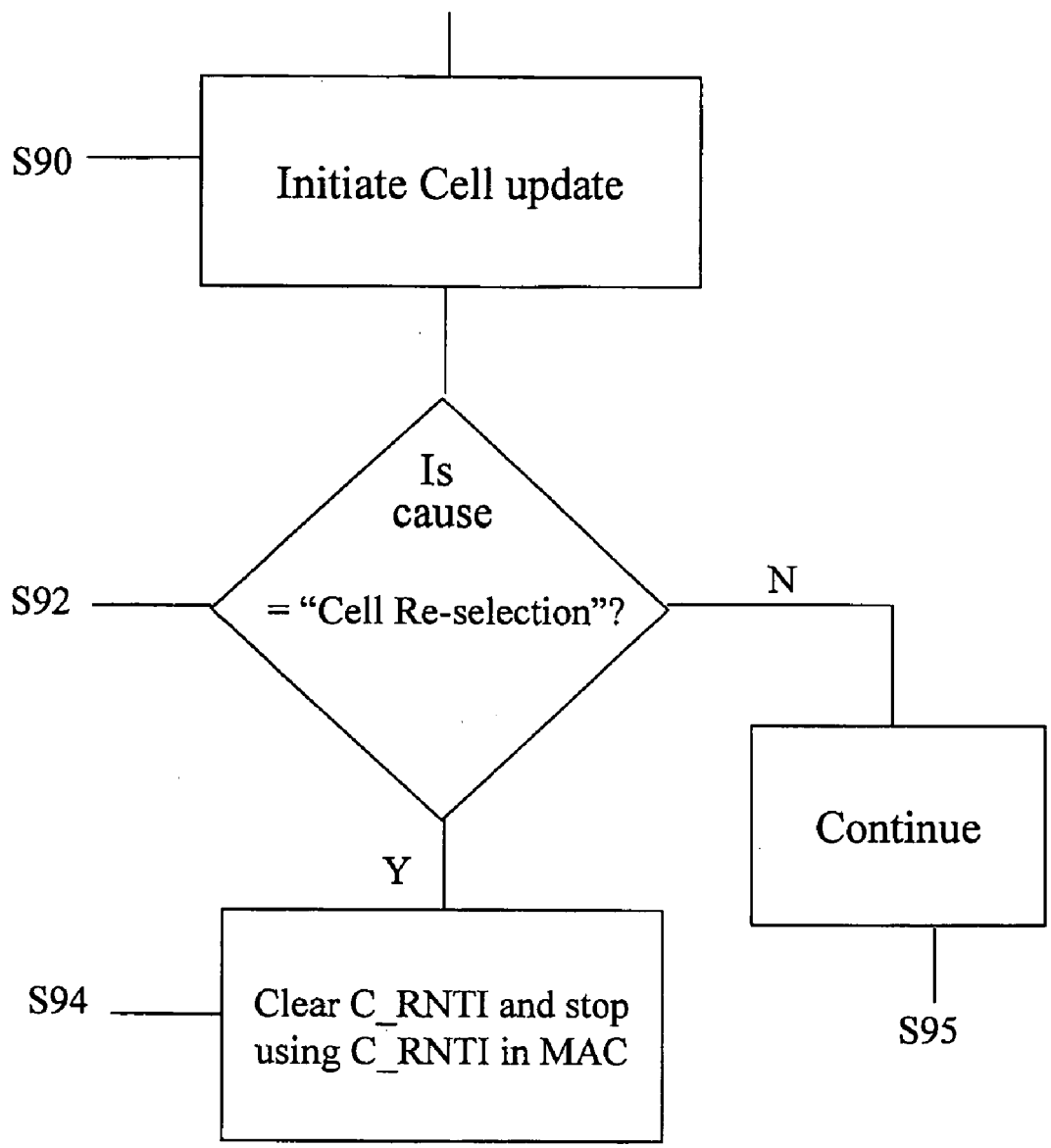
FIG. 9 illustrates the operation of a fifth embodiment.

FIG. 9 is a flow chart illustrating a further embodiment which relates to a situation in which the UE is specified to perform Cell Update with cause set to "Cell Re-selection". For instance, in the 23.331 standard, a UE initiates a cell update procedure according to subclause 8.3.1 using the cause "Cell re-selection" in several sections, for instance:

In Section 8.2.2.3—when exiting Cell_DCH to Cell_FACH, where UE selects a different cell to the one specified. If, as conventional, the UE does not treat this cell selection as a cell re-selection, then the C-RNTI supplied may be used in the selected cell, if the UTRAN fails to provide a C-RNTI in CUC. However having the UE perform Cell Update with cause set to "Cell Re-selection" causes the stored C-RNTI supplied to be deleted. There are cases that include a frequency change and those that do not.

In Section 8.2.2.3—remaining in Cell_FACH or for Cell_DCH or Cell_FACH to Cell_PCH.

In Section 8.2.2.7—following a physical channel failure.

In all of these situations, the UE is arranged to carry out all the steps that it would carry out when initiating a cell re-selection in response to a measurement routine that indicates that a change of cell (or frequency) is required. These steps are set out in Section 8.3.1.2 of the 25.331 standard and include the following:

1> if the UE performs cell re-selection:
2> clear the variable C_RNTI; and
2> stop using that C_RNTI just cleared from the variable C_RNTI in MAC.

Other steps may also be carried out as set out in Section 8.3.1.2. This also applies when undergoing URA Update procedure.

As shown in FIG. 9, when the UE has to initiate cell update at step S90, the UE determines whether the cause for the cell update is set to "cell re-selection" S92. If so, the UE carries out further steps at S94 such as clearing the C_RNTI variable and stopping the use of C-RNTI in the MAC layer. If the cause is not set to "cell re-selection" the UE continues in the usual manner as shown at step S95.

Figure 10:
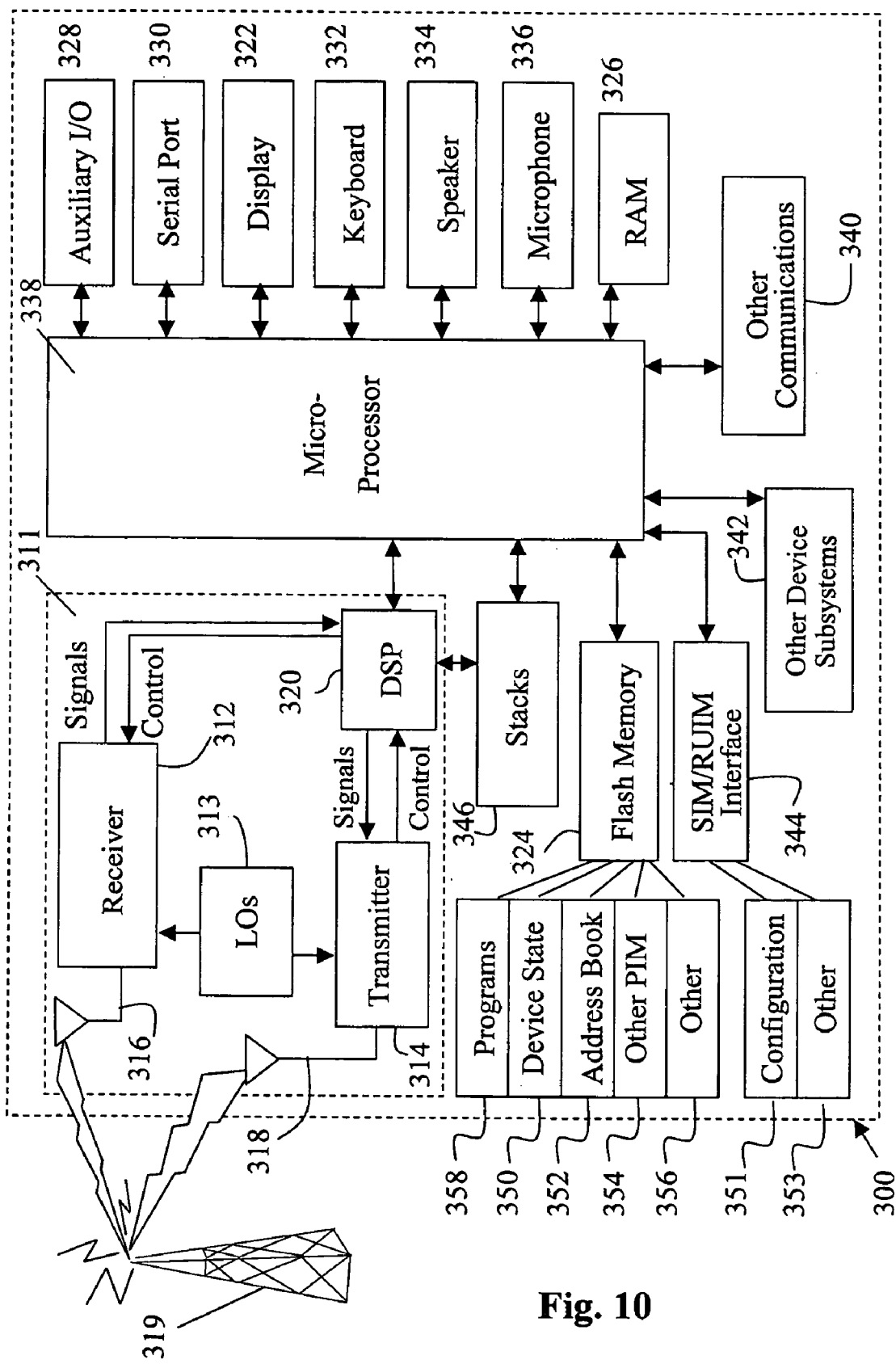
FIG. 10 is a block diagram illustrating a mobile device, which can act as a UE and co-operate with the apparatus and methods of FIGS. 1 to 9.

Turning now to FIG. 10, FIG. 10 is a block diagram illustrating a mobile device, which can act as a UE and co-operate with the apparatus and methods of FIGS. 1 to 9, and which is an exemplary wireless communication device. Mobile station 300 is preferably a two-way wireless communication device having at least voice and data communication capabilities. Mobile station 300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 300 is enabled for two-way communication, it will incorporate a communication subsystem 311, including both a receiver 312 and a transmitter 314, as well as associated components such as one or more, preferably embedded or internal, antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate. For example, mobile station 300 may include a communication subsystem 311 designed to operate within the Mobitex™ mobile communication system, the DataTAC™ mobile communication system, GPRS network, UMTS network, or EDGE network.

Network access requirements will also vary depending upon the type of network 319. For example, in the Mobitex and DataTAC networks, mobile station 300 is registered on the network using a unique identification number associated with each mobile station. In UMTS and GPRS networks, however, network access is associated with a subscriber or user of mobile station 300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 300 will be unable to carry out any other functions involving communications over the network 319. The SIM interface 344 is normally similar to a card-slot into which a SIM card can be inserted and ejected like a diskette or PCMCIA card. The SIM card can have approximately 64K of memory and hold many key configuration 351, and other information 353 such as identification, and subscriber related information.

When required network registration or activation procedures have been completed, mobile station 300 may send and receive communication signals over the network 319. Signals received by antenna 316 through communication network 319 are input to receiver 312, which may perform such common receiver functions as signal amplification, frequency down conversion, filtering, channel selection and the like, and in the example system shown in FIG. 11, analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Mobile station 300 preferably includes a microprocessor 338 which controls the overall operation of the device. Communication functions, including at least data and voice communications, are performed through communication subsystem 311. Microprocessor 338 also interacts with further device subsystems such as the display 322, flash memory 324, random access memory (RAM) 326, auxiliary input/output (I/O) subsystems 328, serial port 330, keyboard 332, speaker 334, microphone 336, a short-range communications subsystem 340 and any other device subsystems generally designated as 342.

Some of the subsystems shown in FIG. 11 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the microprocessor 338 is preferably stored in a persistent store such as flash memory 324, which may instead be a read-only memory (ROM) or similar storage element (not shown). Those skilled in the art will appreciate that the operating system, specific device applications, or parts thereof, may be temporarily loaded into a volatile memory such as RAM 326. Received communication signals may also be stored in RAM 326.

As shown, flash memory 324 can be segregated into different areas for both computer programs 358 and program data storage 350, 352, 354 and 356. These different storage types indicate that each program can allocate a portion of flash memory 324 for their own data storage requirements. Microprocessor 338, in addition to its operating system functions, preferably enables execution of software applications on the mobile station. A predetermined set of applications that control basic operations, including at least data and voice communication applications for example, will normally be installed on mobile station 300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 319. In a preferred embodiment, the PIM data items are seamlessly integrated, synchronized and updated, via the wireless network 319, with the mobile station user's corresponding data items stored or associated with a host computer system. Further applications may also be loaded onto the mobile station 300 through the network 319, an auxiliary I/O subsystem 328, serial port 330, short-range communications subsystem 340 or any other suitable subsystem 342, and installed by a user in the RAM 326 or preferably a nonvolatile store (not shown) for execution by the microprocessor 338. Such flexibility in application installation increases the functionality of the device and may provide enhanced on-device functions, communication-related functions, or both. For example, secure communication applications may enable electronic commerce functions and other such financial transactions to be performed using the mobile station 300.

In a data communication mode, a received signal such as a text message or web page download will be processed by the communication subsystem 311 and input to the microprocessor 338, which preferably further processes the received signal for output to the display 322, or alternatively to an auxiliary I/O device 328. A user of mobile station 300 may also compose data items such as email messages for example, using the keyboard 332, which is preferably a complete alphanumeric keyboard or telephone-type keypad, in conjunction with the display 322 and possibly an auxiliary I/O device 328. Such composed items may then be transmitted over a communication network through the communication subsystem 311.

For voice communications, overall operation of mobile station 300 is similar, except that received signals would preferably be output to a speaker 334 and signals for transmission would be generated by a microphone 336. Alternative voice or audio I/O subsystems, such as a voice message recording subsystem, may also be implemented on mobile station 300. Although voice or audio signal output is preferably accomplished primarily through the speaker 334, display 322 may also be used to provide an indication of the identity of a calling party, the duration of a voice call, or other voice call related information for example.

Serial port 330 in FIG. 11, would normally be implemented in a personal digital assistant (PDA)-type mobile station for which synchronization with a user's desktop computer (not shown) may be desirable, but is an optional device component. Such a port 330 would enable a user to set preferences through an external device or software application and would extend the capabilities of mobile station 300 by providing for information or software downloads to mobile station 300 other than through a wireless communication network. The alternate download path may for example be used to load an encryption key onto the device through a direct and thus reliable and trusted connection to thereby enable secure device communication.

Other communications subsystems 340, such as a short-range communications subsystem, is a further optional component which may provide for communication between mobile station 300 and different systems or devices, which need not necessarily be similar devices. For example, the subsystem 340 may include an infrared device and associated circuits and components or a Bluetooth™ communication module to provide for communication with similarly enabled systems and devices.

When mobile device 300 is used as a UE, protocol stacks 346 include apparatus and a method for handling messages that relate to a cell other than the currently operating cell in universal mobile telecommunications system user equipment.

The above-described embodiments of the present application are intended to be examples only. Those of skill in the art may effect alterations, modifications and variations to the particular embodiments without departing from the scope of the application as defined by the appended claims.

It is to be noted that the methods as described have shown steps being carried out in a particular order. However, it would be clear to a person skilled in the art that the order of the evaluation is immaterial with respect to the operation of the method. For instance, the device may determine whether a C-RNTI is included in the CUC before or after determining whether the message includes an appropriate cell identifier. The ordering of the steps as described herein is not intended to be limiting.

It is also to be noted that where a method has been described it is also intended that protection is also sought for a device arranged to carry out the method.

The invention claimed is:

1. A method of handling messages in a mobile telecommunications system, the system comprising a network of a plurality of cells and at least one user equipment device, the method comprising:
   receiving at the user equipment device a non-broadcast message from the network;
   examining the non-broadcast message to identify a cell identifier relating to the cell of the network from which the non-broadcast message was first queued to be sent;
   when a cell identifier is identified, examining the cell identifier to determine if the cell of the network from which the non-broadcast message was first queued to be sent corresponds with the cell of the network with which the user equipment device is currently communicating; and
   when the cell of the network from which the non-broadcast message was first queued to be sent does not correspond with a cell of the network with which the user equipment device is currently communicating, the user equipment does not fully carry out the requirement of the non-broadcast message.

2. A method according to claim 1 further comprising, when a reconfiguration message is received without frequency information, and when the reconfiguration message includes a cell identifier, the user equipment device ignores the content of the cell identifier and of a new user equipment identifier "New C-RNTI" if the "New C-RNTI" is included in the received reconfiguration message.

3. A method according to claim 1 further comprising, when the cell of the network from which the non-broadcast message was first queued to be sent does not correspond with the cell of the network with which the user equipment device is currently communicating, ignoring any C-RNTI included in the non-broadcast message.

4. A method according to claim 1 further comprising, when the cell of the network from which the non-broadcast message was first queued to be sent does not correspond with the cell of the network with which the user equipment device is currently communicating, ignoring the non-broadcast message.

5. A method according to claim 1 further comprising, when the cell of the network from which the non-broadcast message was first queued to be sent does not correspond with the cell of the network with which the user equipment device is currently communicating, rejecting the non-broadcast message.

6. A method according to claim 1 further comprising, when the cell of the network from which the non-broadcast message was first queued to be sent does not correspond with the cell of the network with which the user equipment device is currently communicating, causing the user equipment device to go to an idle state.

7. A method according to claim 1 wherein the cell identifier comprises CPICH or CPCCH.

* * * * *